United States Patent [19]
Sabee et al.

[11] Patent Number: 5,429,220
[45] Date of Patent: Jul. 4, 1995

[54] TORQUE TRANSFER SYSTEM EMPLOYING RESILIENT DRIVE RING

[75] Inventors: Janet M. Sabee, Franksville; Arthur A. Lines, Racine, both of Wis.

[73] Assignee: Twin Disc Incorporated, Racine, Wis.

[21] Appl. No.: 97,513

[22] Filed: Jul. 26, 1993

[51] Int. Cl.⁶ .................................... F16D 13/68
[52] U.S. Cl. ..................... 192/70.17; 192/106.1; 192/30 V; 464/88; 464/150; 464/903
[58] Field of Search ............... 192/70.17, 106.1, 30 V; 464/75, 87, 88, 150, 903

[56] References Cited

U.S. PATENT DOCUMENTS

| | | | |
|---|---|---|---|
| 2,857,777 | 10/1958 | Porter | 74/432 |
| 3,199,364 | 8/1965 | Dew | 74/460 |
| 3,216,267 | 11/1965 | Dolza | 74/219 |
| 3,245,508 | 4/1966 | Livezey | 192/107 |
| 3,548,984 | 12/1970 | Root | 192/70.17 |
| 3,557,633 | 1/1971 | Frerichs | 74/447 |
| 3,631,953 | 1/1972 | Snoy et al. | 192/70.17 |
| 3,678,708 | 7/1972 | Ernst et al. | 64/11 R |
| 3,727,431 | 4/1973 | Yokel | 64/27 NM |
| 3,861,172 | 1/1975 | Symann | 64/27 NM |
| 4,464,141 | 8/1984 | Brown | 464/75 |
| 4,657,124 | 4/1987 | Flotow | 192/13 R |
| 4,680,979 | 7/1987 | Morishita et al. | 74/7 E |
| 4,781,654 | 11/1988 | Walter et al. | 464/89 |

FOREIGN PATENT DOCUMENTS

| | | | |
|---|---|---|---|
| 412339 | 2/1910 | France | 192/70.17 |
| 675757 | 5/1939 | Germany | 192/70.17 |
| 1045438 | 12/1958 | Germany | 192/70.17 |
| 526598 | 9/1940 | United Kingdom | 192/70.17 |

OTHER PUBLICATIONS

Twin Disc Bulletin 308-R, *Power Take-Offs*, 1992.

*Primary Examiner*—Andrea L. Pitts
*Attorney, Agent, or Firm*—Nilles & Nilles

[57] ABSTRACT

A torque transfer system is provided for transferring torque from an input element such as a flywheel of an internal combustion engine to an output element such as a PTO shaft. The torque transfer system includes the input and output elements and a drive system comprising a drive ring attached to the input element and a drive plate positively or non-positively coupled to the output element. The drive ring transfers torque to the drive plate so as to absorb torsional vibrations which occur during operation of the system, so as to resist abrasion of the drive ring from the drive plate, and so as to resist failure from rotational shock loads imposed on the drive ring by the drive plate. To this end, the drive ring is formed with resilient teeth which, though overlying metal support lugs imparting sufficient rigidity to the teeth to transfer torque to the drive plate, provide the sole contact surface between the drive ring and the drive plate and thus assuredly provide the desired damping and wear resistance under all operating conditions. The resilient teeth and the mating teeth on the drive plate preferably take the form of oversized lugs which are resistant to failure from rotational shock loads.

18 Claims, 4 Drawing Sheets

TORQUE TRANSFER SYSTEM EMPLOYING RESILIENT DRIVE RING

BACKGROUND OF THE INVENTION

1. Field of the Invention

The invention relates to drive rings and, more particularly, relates to drive rings for transmitting torque from prime movers such as internal combustion engines to output elements such as power take-off shafts.

2. Discussion of the Related Art

Drive rings for transmitting rotational torque from prime movers such as gasoline or diesel engines and the like to output elements such as power take-off (PTO) shafts are well known. The typical drive ring is formed from a rigid metal material such as steel, is bolted or otherwise attached to the prime mover flywheel, and presents a relatively large number of relatively small internal metallic teeth which mate with external teeth of a drive plate. The drive plate may be coupled to an output element such as a shaft, or may be positively coupled to the output element.

The conventional drive ring having small metallic teeth exhibits several drawbacks and disadvantages. For instance, the metallic teeth are incapable of absorbing torsional vibrations which occur during operation of the drive train and which could damage or result in premature failure of the teeth on the drive ring and/or the drive plate. In addition, if the drive plate is a friction disc of a clutch, relative axial and/or radial movement between the drive plate and the drive ring causes the friction materials of the disc to abrade teeth of the drive ring. This abrasion leads to accelerated wear of the metallic drive ring teeth, thus leading to increased "chatter" and possibly to premature failure of the drive ring. The relatively small teeth on the drive ring and the drive plate also may be incapable of resisting the relatively high rotational shock loads which may be imposed on the mating teeth during operation of the system.

OBJECTS AND SUMMARY OF THE INVENTION

It is therefore an object of the invention to provide a drive element such as a drive ring which can damp rotational vibrations which occur during operation of the drive train system.

Another object of the invention is to provide a drive element which is resistant to abrasion from contact with the mating drive plate.

In accordance with a first aspect of the invention, these objects are achieved by forming the contact surfaces of the drive element from a resilient elastomeric material which can absorb vibrations and which is resistant to abrasion. More specifically, the drive element includes a rigid circular rim, a plurality of tooth support lugs extending from the rim, and a plurality of elastomeric teeth mounted around a peripheral surface of the rim and at least partially encasing the support lugs, the teeth being dimensioned so as to form the sole contact elements of the drive element.

Another object of the invention is to provide a drive system employing a drive ring of the type described above.

In accordance with another aspect of the invention, this object is achieved by providing a drive system including a drive plate having outwardly extending teeth and including a drive ring. The drive ring further includes a rigid annular rim and a plurality of inwardly extending resilient elastomeric teeth mounted around an inner peripheral surface of the rim. The elastomeric teeth mate with the teeth of the drive plate so as to form the sole contact surface between the drive ring and the drive plate under substantially all operating conditions.

Still another object of the invention is to provide a drive system employing a drive ring of the type described above and a drive plate which are both resistant to failure from rotational shock loads.

In accordance with another aspect of the invention, these objects are achieved by providing large, lug-shaped teeth on the drive ring and the mating drive plate.

Still another object of the invention is to provide a torque transfer system employing a drive ring and a drive plate of the type described above.

In accordance with yet another aspect of the invention, the torque transfer system includes an input element, an output element, and a drive system. The drive system transfers torque from the input element to the output element and is constructed as described above. The input element may comprise a flywheel, and the output element may comprise an output shaft. The drive plate of the drive system may be coupled either positively or non-positively to the output element.

Yet another object of the invention is to provide a method of transferring torque from an input element to an output element, wherein the torque transfer occurs without abrading the drive ring of the drive system, and wherein the torsional vibrations occurring during operation of the torque transfer system are dampened.

In accordance with still another aspect of the invention, this object is achieved by transferring torque from the input element to a drive ring attached to the input element, the drive ring including a rigid annular rim and a plurality of inwardly extending resilient elastomeric teeth mounted around an inner peripheral surface of the rim. Subsequent steps include transferring torque from the elastomeric teeth of the drive ring to a drive plate under substantially all operating conditions, and transferring torque from the drive plate to the output element.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which.

DETAILED DESCRIPTION OF THE PREFERRED EMBODIMENTS

Resume

Figure 1:
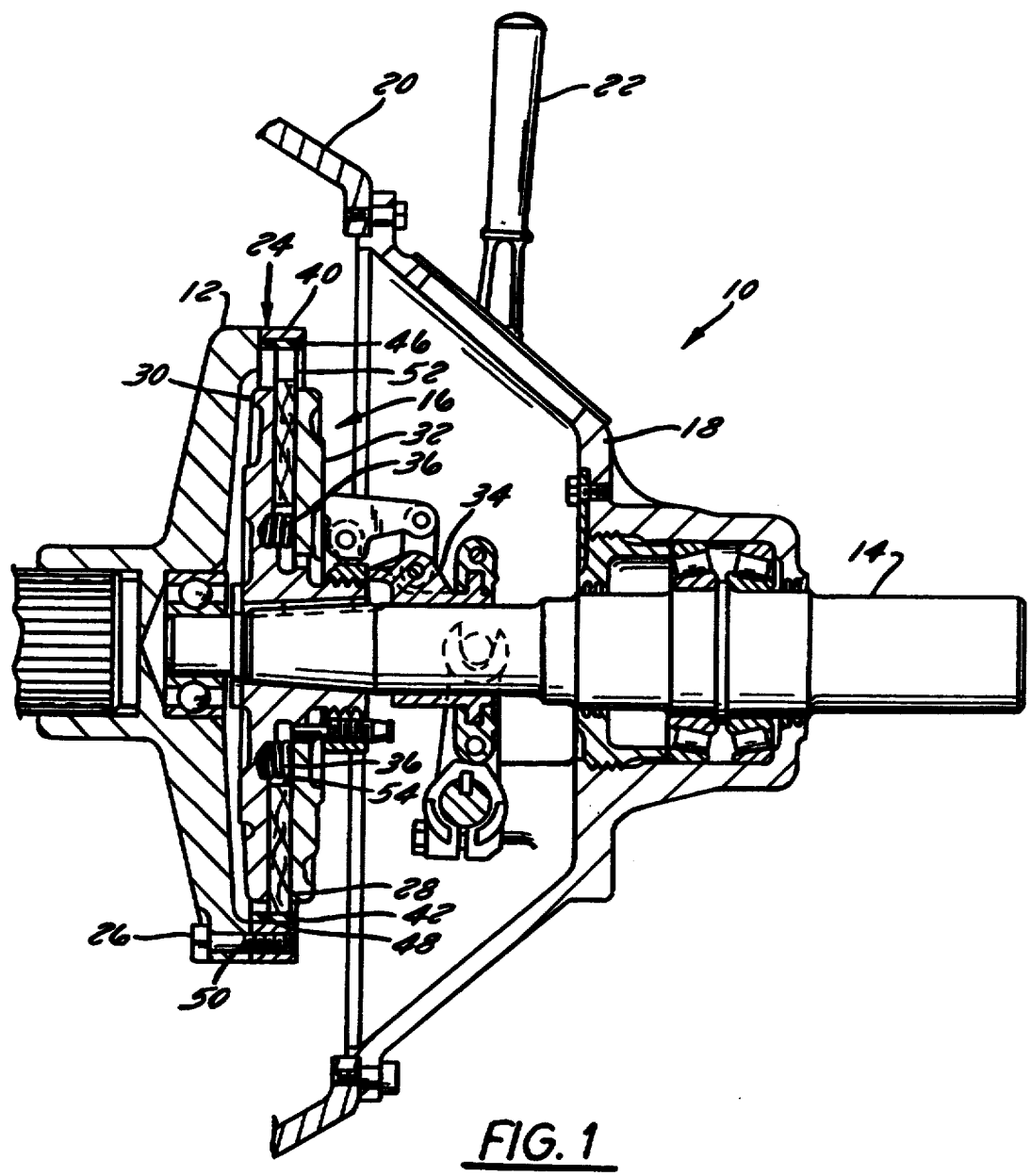
FIG. 1 is a sectional elevation view of a torque transfer system employing a drive system constructed in accordance with a first embodiment of the invention.
Figure 2:
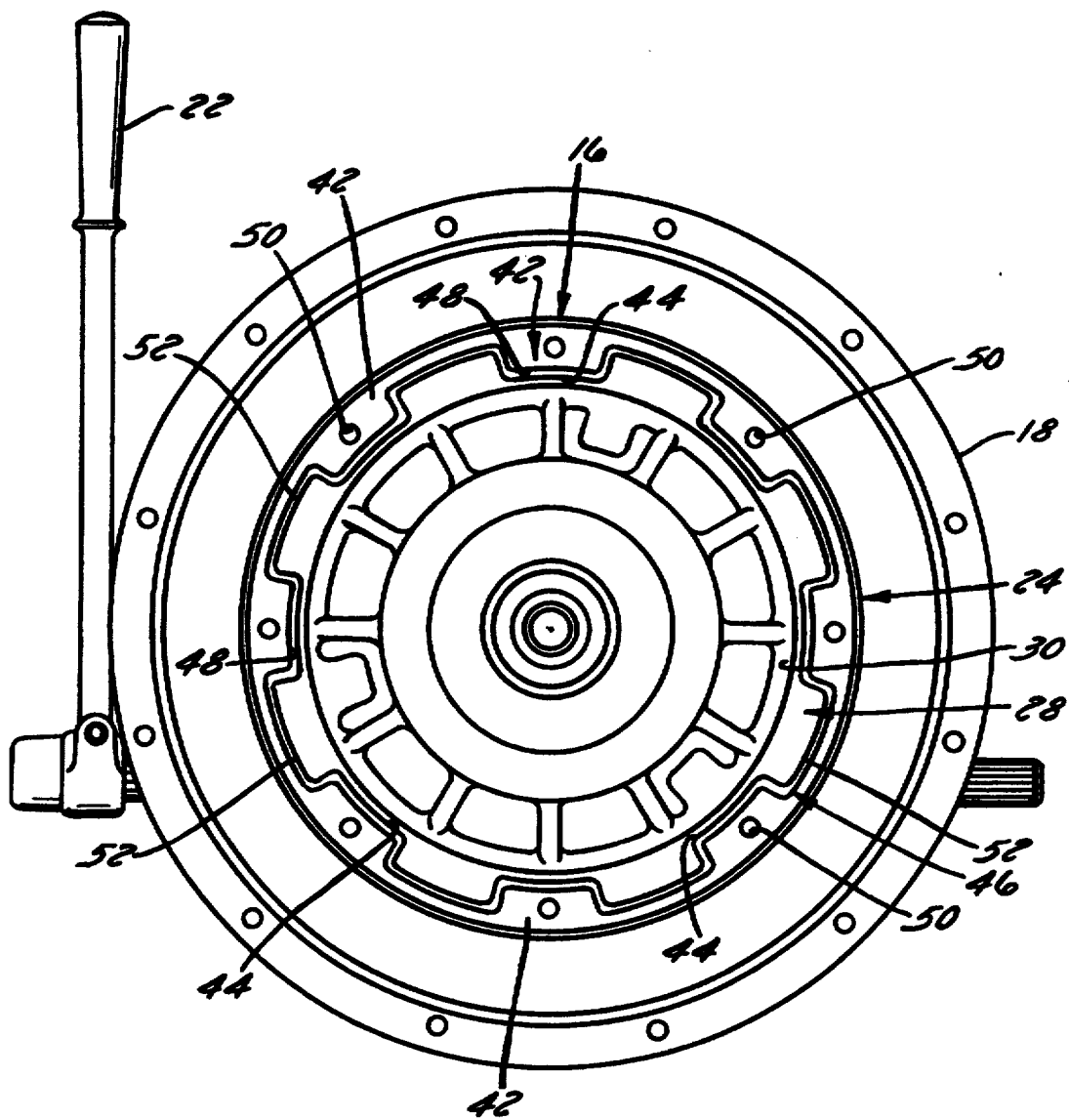
FIG. 2 is an end view of a portion of the torque transfer system of FIG. 1.
Figure 3:
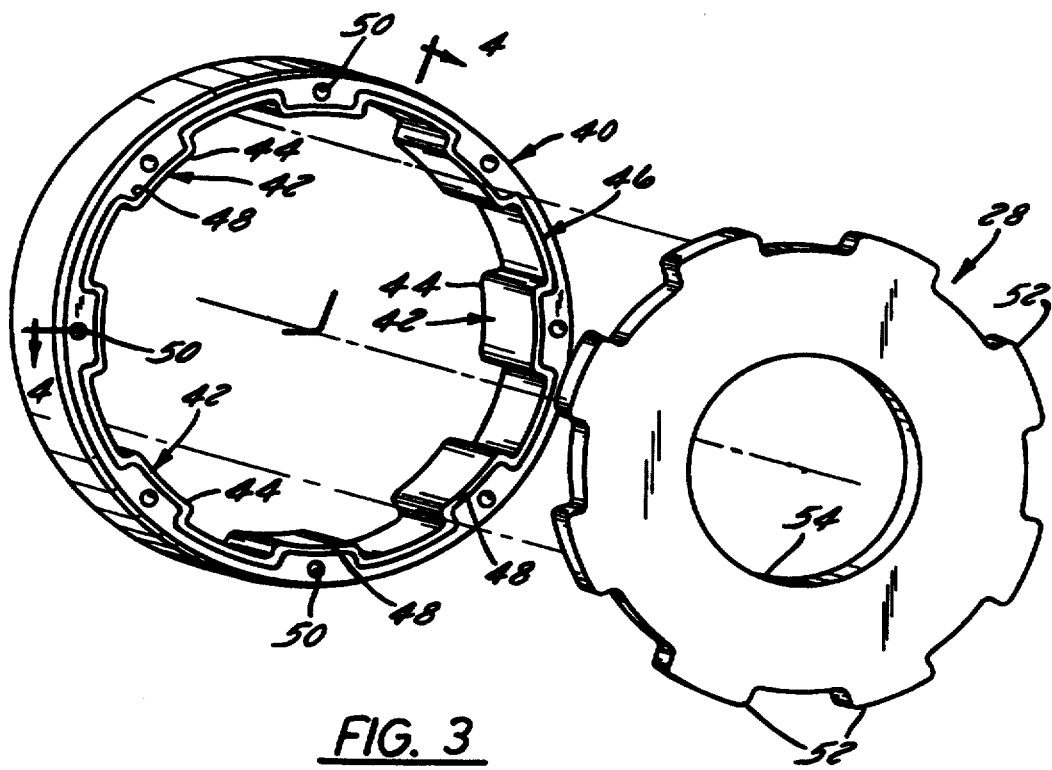
FIG. 3 is a partially exploded perspective view of the drive system of FIGS. 1 and 2.
Figure 4:
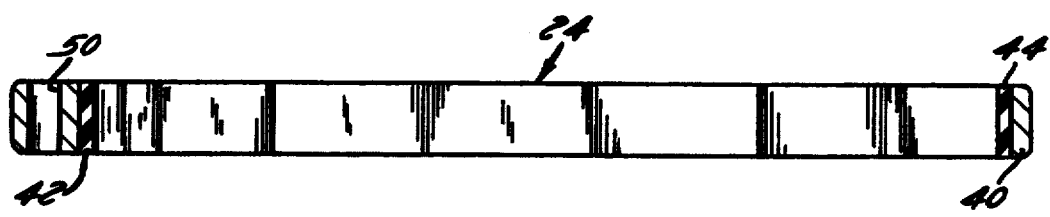
FIG. 4 is a sectional view taken along the lines 4—4 in FIG. 3.

Pursuant to the invention, a torque transfer system is provided for transferring torque from an input element such as a flywheel of an internal combustion engine to an output element such as a PTO shaft. The torque transfer system includes the input and output elements and a drive system comprising a drive ring attached to the input element and a drive plate positively or nonpositively coupled to the output element. The drive ring transfers torque to the drive plate so as to absorb torsional vibrations which occur during operation of the system, so as to resist abrasion of the drive ring from the drive plate, and so as to resist failure from rotational shock loads imposed on the drive ring by the drive plate. To this end, the drive ring is formed with resilient elastomeric teeth which, though overlying metal support lugs imparting sufficient rigidity to the teeth to transfer torque to the drive plate, provide the sole contact surface between the drive ring and the drive plate and thus assuredly provide the desired damping and wear resistance under all operating conditions. The resilient elastomeric teeth and the mating teeth on the drive plate preferably take the form of oversized lugs which are resistant to failure from rotational shock loads.

System Overview and Construction and Operation of the First Embodiment

Referring now to the drawings and to FIGS. 1-4 in particular, a torque transfer system 10 constructed in accordance with the present invention includes input and output elements 12 and 14 and a drive system 16 coupling the input and output elements to one another. The drive system 16 is disposed in a housing 18 which, in the illustrated embodiment, is bolted or otherwise secured to a housing 20. Housing 20 encases a suitable prime mover such as a gasoline or diesel engine.

The illustrated torque transfer system 10 comprises a PTO assembly in which the input element comprises a flywheel 12 and the output element comprises an output shaft 14. Flywheel 12 is coupled to the prime mover, and output shaft 4 extends beyond the housing 18 for access by a driven device.

The drive system 16 is designed to transfer torque positively or nonpositively from the flywheel 12 to the shaft 14 and, in the embodiment illustrated in FIGS. 1-4, comprises a PTO clutch which can be selectively engaged upon actuation of a handle 22. Clutch 16 comprises a drive ring 24 connected to the flywheel 12 via bolts 26. Clutch 16 also comprises a drive plate 28 in the form of a friction disc mating with the drive ring 24. Disc 28 is flanked by front and rear plates 30 and 32. Front plate 30 is keyed or otherwise affixed to shaft 14, and rear plate 32 is mounted on a sleeve 34 which, upon actuation of handle 22, slides axially along the shaft 14 against the force of springs 36 to non-positively couple the friction disc 28 to the shaft 14. The construction and operation of the torque transfer system 10 including the drive system 16 as thus far described are, per se, well known and thus will not be described in greater detail.

Drive ring 24 is relatively larger—on the order of 12 inches—and includes a rigid metal annular rim 40 having a plurality of teeth 42 extending radially inwardly from an inner peripheral surface thereof. Teeth 42 are in the form of oversized lugs and should be sufficiently large so as to resist failure from rotational shock loads imposed on the system during use. In the illustrated embodiment, the inner peripheral surface of each of these teeth has an arc length L of approximately 22.5°.

Teeth 42 are also designed to absorb torsional vibrations which occur during operation of the system and so as to resist abrasion from the friction disc 28. To this end, each of the teeth 42 has an engaging or contact surface 44 formed from rubber or another suitable resilient elastomeric material. In the illustrated embodiment, these engaging surfaces are formed on a generally ring-shaped element 46 having an outer peripheral surface which has a contour which complements that of the inner peripheral surface of the rim 40 including the support lugs 48 detailed below. Element 46 is bonded or otherwise affixed to the rim 40.

The resilient elastomeric engaging or contact surface 44 of each of the teeth 42 overlies a corresponding support lug 48 which extends radially inwardly from the rim 40 and which, in the illustrated embodiment, is formed integral with the rim. Axial bores 50 are formed through the lugs 48 and receive the bolts 26 connecting the drive ring 24 to the flywheel 12. Each lug 48 of the illustrated embodiment is shaped so as to present an inner peripheral surface having a contour generally matching that of the inner peripheral surface of the overlying elastomeric layer forming the engaging surface 44. However, each lug 48 could be smaller than illustrated so long as it provides sufficient support for the elastomeric engaging surface 44 to permit the surface 44 to transfer torque to the disc 28 without shearing. Each lug 48 could also be slightly larger than illustrated so long as the thickness of the overlying engaging surface 44 is maintained such that this surface 1) always provides the sole engaging surface for the drive ring and 2) provides adequate shock absorption and wear resistance.

The friction disc 28 forming the drive plate of the embodiments of FIGS. 1-4 can be formed from any suitable friction material. Disc 28 is annular and has outer peripheral teeth 52 and an enlarged central bore 54 receiving the springs 36 as well as a hub for the front plate 30. Teeth 52 are lug-shaped and have a shape which complements that of the teeth 42 of the drive ring 24. Teeth 52 are designed to mate with the teeth 42 without undue play while still permitting substantially unrestricted axial movement of the disc 28 with respect to the drive ring 24 upon actuation of the clutch 16. To this end, the plate 30 is significantly thinner than the drive ring 24 so as to permit the plate 30 to slide axially within the drive ring 24 while still being driven by the drive ring.

In use, when handle 22 is actuated to compress the disc 28 as described above, torque is transmitted from the flywheel 12, through the drive ring 24 and the disc 28, and to the shaft 14. Friction caused by axial sliding of the disc 28 within the drive ring 24 does not significantly abrade the elastomeric material of teeth 42 of the drive ring. The resilient elastomeric engaging or contact surfaces 44 of teeth 42, though compressed through contact with the teeth 52 and disc 28, continue to present the sole engaging surfaces of the drive ring 24 throughout the operating range of the clutch 16, thus assuring that torsional vibrations occurring in the system are absorbed by the resilient teeth. In addition, failure from shock loads imposed on the system by the shaft 14 is resisted by the large lug-shaped teeth 42 and 52.

The inventive drive system need not take the form of a friction clutch as illustrated but could positively couple an input element to an output element. One such positive coupling will now be described.

Construction and Operation of Second Embodiment

Figure 6:
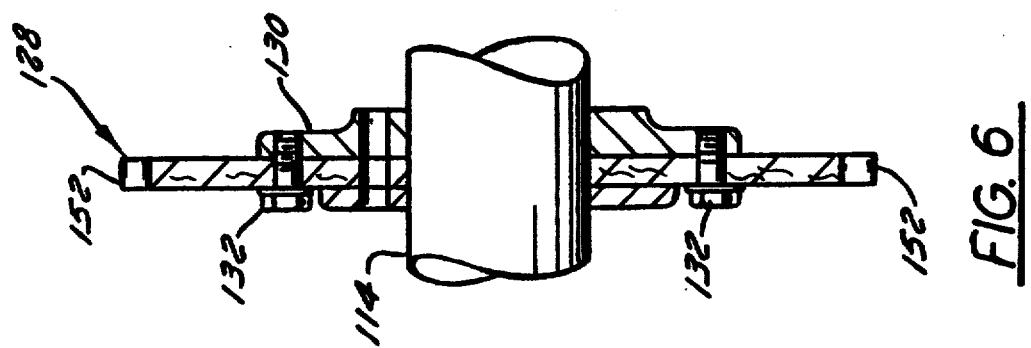
FIG. 6 is a sectional view taken along the lines 6—6 in FIG. 5.
Figure 5:
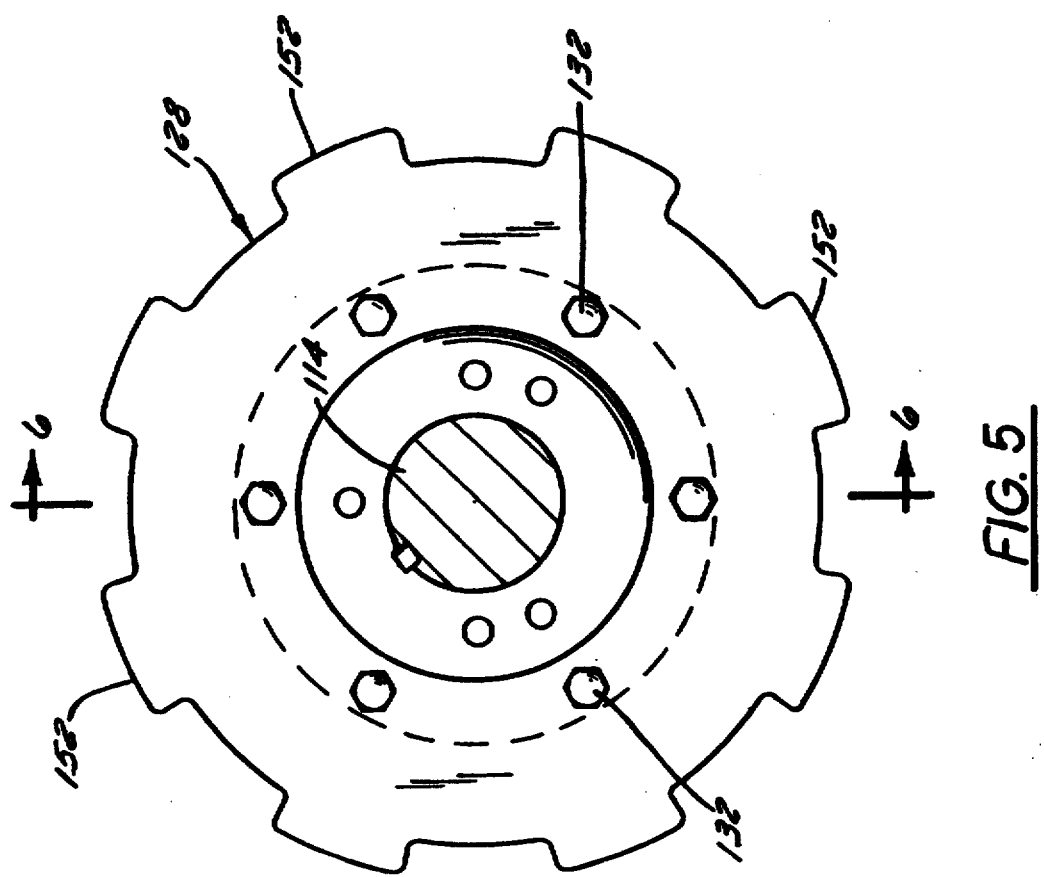
FIG. 5 is an end view of a drive plate constructed in accordance with a second embodiment of the invention.

Referring now to FIGS. 5 and 6, a drive plate 128 is illustrated, the outer peripheral surface of which is shaped exactly as that of the drive plate 28 described above and which is thus designed for mating with the drive ring 24 described above. However, rather than being designed for non-positive coupling with an output shaft, drive plate 128 is positively coupled to a corresponding output shaft 114. More specifically, drive plate 128 is secured to a hub 130 by bolts 132 or the like, and hub 130 is in turn keyed or otherwise positively coupled to the shaft 114.

Drive plate 128 may be formed from metal but is preferably formed from a friction material because 1) plates made from such materials are relatively inexpensive, and 2) such materials wear more quickly than do the elastomeric engaging surfaces 44 of the teeth 42 of the drive ring 24. This more rapid wear is significant because the drive plate of the typical drive system is much easier to replace than is the drive ring.

In use, torque from the flywheel 12 is transferred from the drive ring 24 (FIG. 1) and its associated teeth 42 to the teeth 152 of the plate 128 in the same manner and with the same benefits described above in connection with the first embodiment. This torque is transmitted positively to the shaft 114 via the hub 130.

Many changes and modifications could be made to the present invention without departing from the spirit and scope thereof. For instance, the elastomeric teeth could if desired be provided on the drive plate instead of or in addition to the drive ring. Moreover, the drive ring and drive plate need not be connected to a flywheel and an output shaft, but could be connected to virtually any input and output elements. Other changes and modifications which could be made to the invention without departing from the spirit and scope thereof will become apparent from the reading of the appended claims.

We claim:

1. A drive element comprising:
   (A) a rigid circular rim;
   (B) a plurality of tooth support lugs extending from said rim; and
   (C) a plurality of resilient elastomeric teeth mounted around a peripheral surface of said rim and at least partially encasing and affixed to said support lugs, said teeth being dimensioned so as to form sole contact elements via which said drive element is capable of contacting a driven element, said teeth being dimensioned and configured to non-fixedly engage said driven element so as to permit substantially unrestricted axial movement between said drive element and said driven element.

2. A resilient drive element as defined in claim 1, wherein an inner peripheral surface of each of said teeth has an arc length of approximately 22.5°.

3. A resilient drive element as defined in claim 1, wherein said rim is an annular rim and said support lugs and said teeth extend inwardly from said rim.

4. A resilient drive element as defined in claim 1, wherein said teeth are formed on a generally ring-shaped element having a peripheral surface, said peripheral surface having a shape which complements that of said rim and said support lugs.

5. A drive system comprising:
   (A) a drive plate having outwardly extending teeth; and
   (B) a drive ring including
      (1) a rigid annular rim,
      (2) a plurality of tooth support lugs extending inwardly from an inner peripheral surface of said rim, and
      (3) a plurality of inwardly extending resilient elastomeric teeth mounted around said inner peripheral surface of said rim, at least partially encasing and affixed to said support lugs, and mating with said teeth of said drive plate so as to form sole contact surfaces between said drive ring and said drive plate, said drive plate being axially movable relative to said drive ring, said elastomeric teeth non-fixedly engaging said teeth of said drive plate so as to permit substantially unrestricted axial movement of said drive plate relative to said drive ring.

6. A drive system as defined in claim 5, wherein an inner peripheral surface of each of said teeth of said drive plate and said elastomeric teeth has an arc length of approximately 22.5°.

7. A resilient drive element as defined in claim 6, wherein said elastomeric teeth are formed on a generally ring-shaped element having an outer peripheral surface, said peripheral surface having a shape which complements an inner peripheral surface of said rim.

8. A torque transfer system comprising:
   (A) an input element;
   (B) an output element; and
   (C) a drive system transferring torque from said input element to said output element, said drive system including
      (1) an axially movable drive plate coupled to said output element and having outwardly extending teeth, and
      (2) a drive ring which is attached to said input element and which includes
         (a) a rigid annular rim,
         (b) a plurality of rigid tooth support lugs extending inwardly from an inner peripheral surface of said rim, and
         (c) a plurality of inwardly extending resilient elastomeric teeth mounted around said inner peripheral surface of said rim, at least partially encasing and affixed to said support lugs, and mating with said teeth of said drive plate so as to form sole contact surfaces between said drive ring and said drive plate, said elastomeric teeth non-fixedly engaging said teeth of said drive plate so as to permit substantially unrestricted axial movement of said drive plate relative to said drive ring.

9. A torque transfer system as defined in claim 8, wherein an inner peripheral surface of each of said teeth of said drive plate and said elastomeric teeth has an arc length of approximately 22.5°.

10. A torque transfer system as defined in claim 8, wherein said elastomeric teeth are formed on a generally ring-shaped element having an outer peripheral surface, said outer peripheral surface of said ring-shaped element having a shape which complements the surfaces of said rim and said support lugs.

11. A torque transfer system as defined in claim 8, wherein said drive plate comprises a friction disc of a clutch which is non-positively coupled to said output element.

12. A torque transfer system as defined in claim 8, wherein said drive plate is positively coupled to said output element.

13. A torque transfer system as defined in claim 8, wherein said input element comprises a flywheel and said output element comprises a shaft.

14. A torque transfer system comprising:
(A) an input element;
(B) an output element; and
(C) a drive system transferring torque from said input element to said output element, said drive system including
  (1) an axially movable drive plate having outwardly extending enlarged teeth in the form of lugs, and
  (2) a drive ring which is attached to said input element and which includes a plurality of inwardly extending teeth mating with said teeth of said drive plate, wherein
    (a) said teeth of said drive ring are in the form of lugs, and wherein
    (b) contact surfaces of said teeth of one of said drive ring and said drive plate are formed from a resilient elastomeric material and non-fixedly engaging said teeth of the other of said drive ring and said drive plate so as to permit substantially unrestricted axial movement of said drive plate relative to said drive ring.

15. A system as defined in claim 14, wherein said contact surfaces of said teeth of said drive ring are formed from said resilient elastomeric material.

16. A system as defined in claim 14, wherein said drive ring further comprises a rigid circular rim and a plurality of tooth support lugs extending inwardly from said rim, and wherein said elastomeric teeth at least partially encase and are affixed to said support lugs.

17. A method of transferring torque from an input element to an output element comprising:
(A) transferring torque from said input element to a drive ring attached to said input element, said drive ring including a rigid annular rim, a plurality of tooth support lugs extending inwardly from an inner peripheral surface of said drive ring, and a plurality of inwardly extending resilient elastomeric teeth mounted around an inner peripheral surface of said rim and at least partially encasing and affixed to said support lugs;
(B) transferring said torque from said elastomeric teeth of said drive ring to mating teeth of a drive plate; and
(C) transferring said torque from said drive plate to said output element by axially moving said drive plate to a position in which rotation of said drive plate is transmitted to said output element, wherein said teeth of said drive ring and said teeth of said drive plate non-fixedly engage one another and permit substantially unrestricted axial movement of said drive plate relative to said drive ring.

18. A method as defined in claim 17, wherein said step (B) comprises transferring torque from said drive ring to said drive plate via teeth in the form of lugs.

* * * * *